(12) United States Patent
Sankar et al.

(10) Patent No.: US 9,684,583 B2
(45) Date of Patent: *Jun. 20, 2017

(54) TRACE DATA EXPORT TO REMOTE MEMORY USING MEMORY MAPPED WRITE TRANSACTIONS

(71) Applicant: Texas Instruments Incorporated, Dallas, TX (US)

(72) Inventors: Karthik Ramana Sankar, Stafford, TX (US); Gary L. Swoboda, Sugar Land, TX (US)

(73) Assignee: Texas Instruments Incorporated, Dallas, TX (US)

( * ) Notice: Subject to any disclaimer, the term of this patent is extended or adjusted under 35 U.S.C. 154(b) by 178 days.

This patent is subject to a terminal disclaimer.

(21) Appl. No.: 14/532,051

(22) Filed: Nov. 4, 2014

(65) Prior Publication Data

US 2015/0127993 A1    May 7, 2015

Related U.S. Application Data

(60) Provisional application No. 61/900,086, filed on Nov. 5, 2013.

(51) Int. Cl.
*G06F 11/00* (2006.01)
*G06F 11/34* (2006.01)
*G06F 11/36* (2006.01)

(52) U.S. Cl.
CPC ...... *G06F 11/3466* (2013.01); *G06F 11/3636* (2013.01); *Y02B 60/165* (2013.01)

(58) Field of Classification Search
CPC .................................................. G06F 11/3466
See application file for complete search history.

(56) References Cited

U.S. PATENT DOCUMENTS 6,779,145 B1 *  8/2004  Edwards ............. G06F 11/3636
                                                       324/73.1
6,918,065 B1 *  7/2005  Edwards ............... G06F 11/348
                                                        341/76

(Continued)

OTHER PUBLICATIONS

Karthik Ramana Sankar and Gary L. Swoboda, "Using an In-System Component as an Embedded Trace Receiver", U.S. Appl. No. 14/501,442, filed Sep. 30, 2014, pp. 1-32.

(Continued)

*Primary Examiner* — Christopher McCarthy
(74) *Attorney, Agent, or Firm* — Lawrence J. Bassuk; Charles A. Brill; Frank D. Cimino (57) ABSTRACT

A method for easily tracing the execution of an application in a computer system having a plurality of computing nodes interconnected by high speed data links is disclosed. While executing the application on one or more of the computing nodes, trace data is collected into a separate temporary trace buffer coupled to each computing node. A trace transfer request event may be generated after collecting a portion of the trace data. The trace data is recorded on a designated recording and analysis computing node by transferring the trace data from each trace buffer to a recording buffer in the designated recording node in response to the transfer request by performing memory mapped write transfers initiated by each computing node that has collected trace data. The address of the recording buffer is memory mapped into an address space of each computing node that has collected trace data.

2 Claims, 7 Drawing Sheets

(56) References Cited

U.S. PATENT DOCUMENTS

| | | | |
|---|---|---|---|
| 7,076,419 B2 | 7/2006 | Swoboda | |
| 8,923,140 B2* | 12/2014 | Noldus | 370/250 |
| 9,369,368 B2* | 6/2016 | Khanal | H04L 43/04 |
| 2008/0162272 A1* | 7/2008 | Huang | G06F 11/3409 |
| | | | 717/127 |
| 2012/0078577 A1* | 3/2012 | Allen | G06F 11/0781 |
| | | | 702/183 |
| 2012/0089876 A1* | 4/2012 | Racz | H04W 24/08 |
| | | | 714/45 |
| 2013/0294257 A1* | 11/2013 | Gonzalez De Langarica | H04W 24/08 |
| | | | 370/242 |
| 2015/0085676 A1* | 3/2015 | Noldus | H04L 65/1069 |
| | | | 370/248 |

OTHER PUBLICATIONS

"CoreSight Components", Technical Reference Manual, ARM DDI 0314H, Sep. 29, 2004 revised Jul. 10, 2009, pp. 1-376.
"TMS320C6678—Multi-core Fixed and Floating-Point Signal Processor", SPRS691, Nov. 2010 revised Mar. 2014, pp. 1-248.

* cited by examiner

TRACE DATA EXPORT TO REMOTE MEMORY USING MEMORY MAPPED WRITE TRANSACTIONS

CLAIM OF PRIORITY UNDER 35 U.S.C. 119(e)

The present application claims priority to and incorporates by reference U.S. Provisional Application No. 61/900,086, filed Nov. 5, 2013, entitled "TRACE DATA EXPORT TO REMOTE MEMORY USING WRITES TO A UNIFIED REMOTE AND LOCAL MEMORY SPACE."

FIELD OF THE INVENTION

This invention generally relates to gathering trace data from an embedded computing node for performance analysis and/or debugging.

BACKGROUND OF THE INVENTION

System on Chip (SoC) is a concept that strives to integrate more and more functionality into a given device. This integration can take the form of either hardware or software solution. Performance gains are traditionally achieved by increased clock rates and more advanced process nodes. Many SoC designs pair a digital signal processor (DSP) with a reduced instruction set computing (RISC) processor to target specific applications. A more recent approach to increasing performance has been to create multi-core devices.

Complex SoCs may include a scalable and convenient method of connecting a variety of peripheral blocks such as processors, accelerators, shared memory and IO devices while addressing the power, performance and cost requirements of the end application. Due to the complexity and high performance requirements of these devices, the chip interconnect tends to be hierarchical and partitioned depending on the latency tolerance and bandwidth requirements of the endpoints.

A typical remote trace data receiver is coupled to a system under test using a diagnostic interface and records trace data generated by one or more trace sources. It generally has enough memory to store large quantities of trace data. The trace data is stored in a "trace buffer" that is circular in nature. Once the trace buffer is full, trace recording either stops or the buffer pointer wraps with the storing of new data over the oldest previously recorded trace data. The trace buffer content may be accessed by a host computer after the storing of trace data has been stopped. Some trace receivers allow the reading of trace data already recorded while the recording of additional trace data continues.

BRIEF DESCRIPTION OF THE DRAWINGS

Particular embodiments in accordance with the invention will now be described, by way of example only, and with reference to the accompanying drawings.

Other features of the present embodiments will be apparent from the accompanying drawings and from the detailed description that follows.

DETAILED DESCRIPTION OF EMBODIMENTS OF THE INVENTION

Specific embodiments of the invention will now be described in detail with reference to the accompanying figures. Like elements in the various figures are denoted by like reference numerals for consistency. In the following detailed description of embodiments of the invention, numerous specific details are set forth in order to provide a more thorough understanding of the invention. However, it will be apparent to one of ordinary skill in the art that the invention may be practiced without these specific details. In other instances, well-known features have not been described in detail to avoid unnecessarily complicating the description.

High performance computing has taken on even greater importance with the advent of the Internet and cloud computing. To ensure the responsiveness of networks, online processing nodes and storage systems must have extremely robust processing capabilities and exceedingly fast data-throughput rates. Robotics, medical imaging systems, visual inspection systems, electronic test equipment, and high-performance wireless and communication systems, for example, must be able to process an extremely large volume of data with a high degree of precision.

Debugging the software used in such systems and optimizing performance of such systems may require extensive development tools. One such set of tools is provided by Code Composer Studio IDE (integrated development environment) which is available from Texas Instruments, for example. Code Composer Studio comprises a suite of tools used to develop and debug embedded applications. It includes an optimizing C/C++ compiler, source code editor, project build environment, debugger, profiler, and many other features. The intuitive IDE provides a single user interface that may take a developer through each step of an application development flow. The overall operation of an IDE is well known and need not be described in detail herein.

In order for an IDE to interact with a system, trace data must be captured while an application is being executed by the system. Typically, trace data is captured by instrumentation and trace generation logic that is tightly coupled to an execution node, such as a processor and memory, in the system. Trace data may be captured from multiple buses within the execution node. Typically, the program counter and various data buses may be traced so that the IDE can determine what instructions are being executed and what data is being moved around within the execution node. As trace data is collected, it may be compressed using known techniques and then stored in a block of memory referred to as a trace buffer. The compressed trace data may then be accessed by the IDE for application debugging and performance optimization, for example.

Embodiments of the invention may provide an improved method and apparatus for collecting trace data within a system that has multiple computing nodes interconnected by high speed data links for use and analysis by an IDE, for example. In one embodiment, an application may be executed on one, or more, of the computing nodes. Trace data may be collected into a temporary trace buffer coupled to the computing node by monitoring the execution of the application using a trace generation module coupled to the first computing node. A trace transfer request event may be sent to a second computing node in the system after collecting a portion of the trace data in the trace buffer. The portion of trace data may be recorded on the second computing node by transferring the portion of trace data from the trace buffer to a recording buffer in the second computing node in response to the transfer request by performing memory mapped write transfers over the high speed data links initiated by the first computing node. The recording buffer is memory mapped into an address space of the first computing node in order to allow such memory mapped transfers.

In the prior art, the trace buffer may be located either in the system memory of the system generating the trace data or external to the system containing the device generating the trace data. The trace buffer may then be accessed by a host computer external to the system containing the device generating the trace data or from within the system generating the trace data when the trace buffer is located in system memory of the system generating the trace data.

Figures 1, 2:
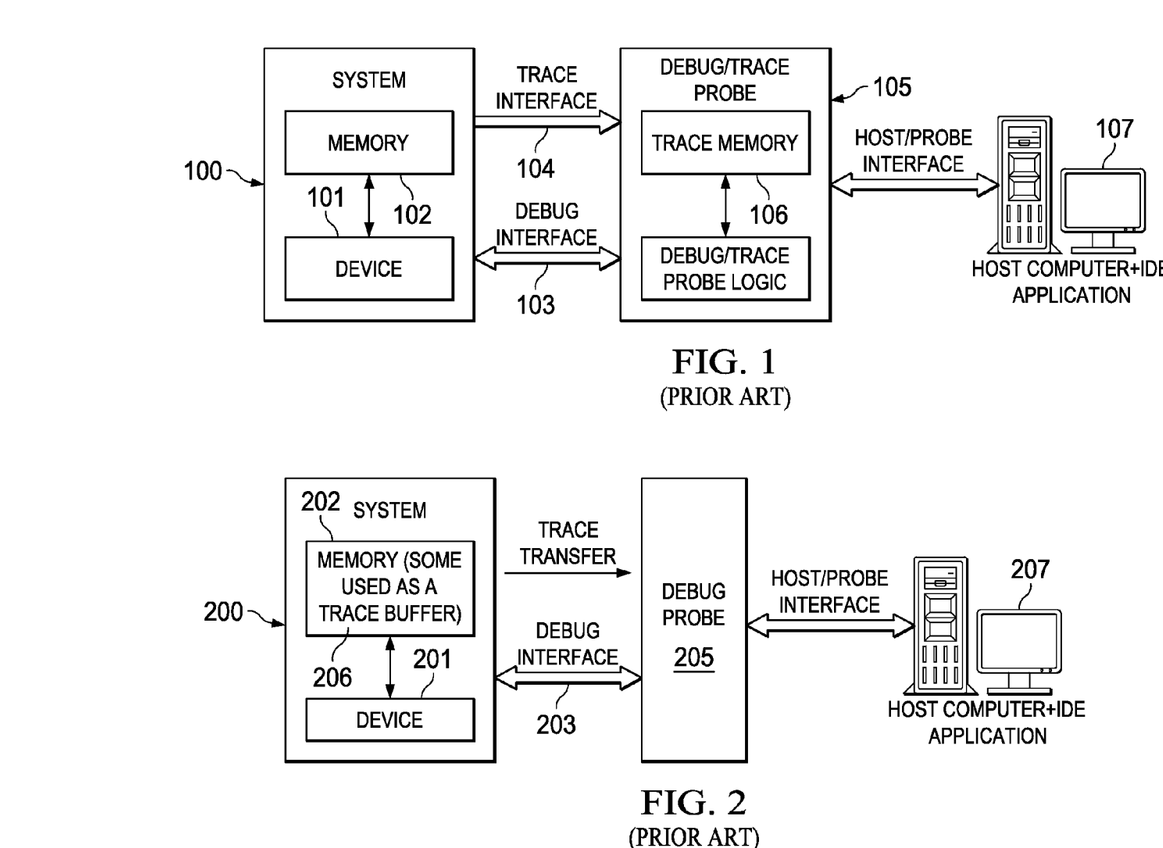
FIGS. 1 and 2 are block diagrams of prior art tracing configurations.

FIG. 1 is a block diagram of a prior art system 100 that includes a device 101 which is typically an execution engine such as a microprocessor and memory 102 for holding instructions and data. In this example, trace receiver memory 106 is located external to system 100 and is coupled to an external debug and trace probe 105 via a special purpose debug interface 103 and a dedicated trace interface 104. Trace probe 105 receives trace data from system 100 via trace interface 104 as the trace data is produced by system 100. An IDE may be executed on another computer, referred to as host computer 107. The IDE may then access the trace data stored in trace receiver memory 106 and provide debug commands to system 100 via debug interface 103. A typical debug interface may utilize a JTAG (Joint Test Action Group) interface that is the common name for the IEEE 1149.1 Standard Test Access Port and Boundary-Scan Architecture. JTAG is widely used for IC (integrated circuit) debug ports. In the embedded processor market, essentially all modern processors implement JTAG when they have enough pins.

FIG. 2 is a block diagram of a prior art system 200 that includes a device 201 which is typically an execution engine such as a microprocessor and memory 202 for holding instructions and data. In this example, trace recording memory 206 is located internal to system 200 in a portion of the system memory. External trace probe 205 may access trace data from the trace buffer 206 within system 200 via a debug interface 203 as the trace data is produced by system 200, or at a later time. An IDE may be executed on another computer, referred to as host computer 207. The IDE may then access the trace data stored in trace buffer 206 within system memory 202 and provide debug commands to system 200 via a debug interface 203.

In another implementation, trace probe 205 may not be used and instead host processor 107 may interface directly to system 200 via a functional interface, such as Universal Serial Bus (USB), or a proprietary interface, for example.

In another prior art implementation, an IDE may be executed by device 201 within system 200 on a multi-tasking basis, for example.

In the cases illustrated in FIG. 2 where the trace buffer is in the system being monitored, the management of the buffer pointers occurs within system 200. In the case illustrated in FIG. 1 where the trace receiver buffer is external to the system, the system generating the trace data has no implicit knowledge (unless informed by some means) the location or size of the buffer. In the aforementioned configuration with an external trace receiver, the system generating the trace data cannot directly access the stored trace data.

When comparing the attributes of internal and external trace receivers, they both have their advantages and disadvantages. An advantage of an internal trace receiver is that a trace data consumer application (e.g. an IDE) running within the system generating the trace data can directly access the trace data via the system's memory map. On the other hand, the internal trace buffer is generally large, preventing this portion of memory from being used by an application. This may degrade system performance and may mask debug or performance issues, making detection and resolution more difficult. Additionally, the trace bandwidth requirement to the internal trace buffer is significantly high, leading to degraded system performance.

An advantage of an external trace receiver is that the receiver's buffer size neither affects system performance or cost. A trace data consumer application (e.g. an IDE) running external to or within the system can access the trace data with the trace receiver via one of its communication interfaces provided it has access to a driver for the trace receiver. On the other hand, a remote trace buffer cannot be easily installed in a field deployed system, whenever a need for capturing trace data arises.

Figure 3:
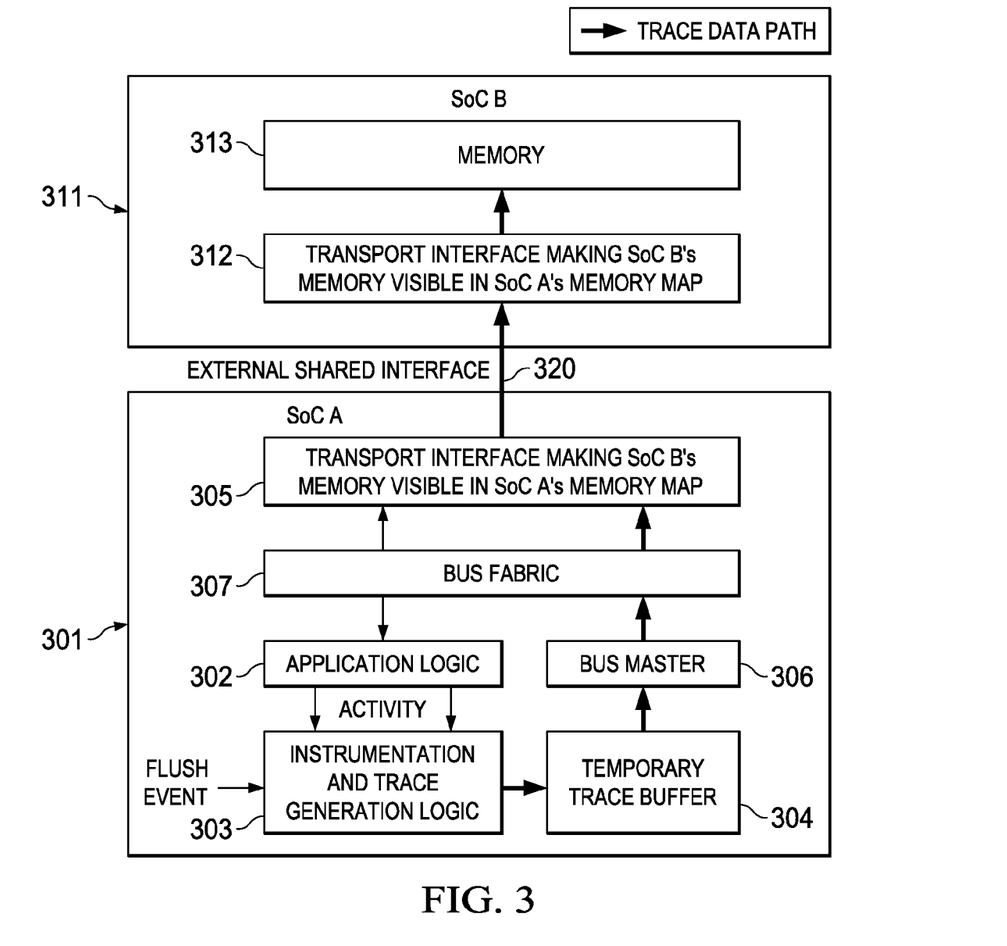
FIG. 3 is a block diagram of a system that provides trace data export to a remote recording buffer using memory mapped read transactions.

FIG. 3 is a block diagram of a system that provides trace data export to a remote recording buffer using memory mapped write transactions. In this embodiment of the invention, the advantages of both an internal and an external trace receiver are combined without the disadvantages of either configuration. In this example, SoC A 301 and SoC B 311 may be connected by a wireless, wired, or optical high speed data interface 320 and may be either components of a single system or components of separate systems.

In this example, an application program may be executed on application logic 302. Application logic 302 may include a processor and memory, for example. The processor may be any one of the known or later developed types of processors, such as a digital signal processor (DSP), a reduced instruction set computer (RISC), various conventional microprocessors, microcomputers, central processing unit (CPU), etc., for example. The memory may include any known or later developed memory configuration, such as volatile or non-volatile memory, various levels of cache memory and bulk memory, read only memory, etc., for example.

The resultant activity in the application logic 302 in SoC A 301 may cause the generation of trace data that is captured by instrumentation and trace logic 303. This trace data is stored in a temporary buffer 304. Various known or later developed techniques may be used to compress the trace data so that more trace information can be stored in a given buffer size. As discussed above, trace data may include the program counter value, instructions, read and write data picked from one or more data buses, status information, timing information, etc., for example. Temporary trace buffer 304 may be implemented as a first in first out (FIFO) buffer or a circular buffer, for example. In this case, pointer logic may be provided so that reading trace data from the temporary buffer may be done by repeatedly reading a same memory address, for example. In another example, temporary trace buffer 304 may be implemented as a ping-pong buffer in which two or more banks of linearly addressed block of memory are filled and emptied in an alternating manner.

The accumulation of a certain amount of trace data in the temporary buffer 304 may initiate a transfer of this data to a set of address associated with SoC B's memory 313. Control logic that manages the temporary trace buffer 304 may be configured to initiate a transfer when the temporary buffer 304 reaches a selected percentage of capacity, such as 75%, for example. The transfer is directed to SoC A transport interface 305 by internal bus fabric 307 which in turn forwards the transfer to SoC B transport interface 312 via a node to node interface 320 shared by the two SoCs. The transport interface in SoC B 312 uses this information to write the data to a designated recording buffer location in SoC B's Memory 313. The transport interface protocol makes the memory in SoC B 313 appear directly addressable from SoC A. With this being the case, the transport interface protocol also provides for the reading and writing of the memory in SoC B 313 from SoC A via the bus fabric in SoC A 307.

Pushing of the trace data from temporary trace buffer 304 may involve repeatedly using a same memory mapped address to access trace buffer 304 if it is organized as a FIFO. In another embodiment in which the temporary trace buffer is implemented as a circular buffer, then a range of address may be used to access the trace data the temporary buffer 304, for example.

In some embodiments, instrumentation and trace generation logic 303 may include control logic to initiate the transactions the push the trace data from the temporary trace buffer 304 to a recording buffer in memory 313. Alternatively, depending on the architecture of SoC B, bus master 306 may operate as a direct memory access (DMA) device and transfer the trace data directly from temporary trace buffer 304 to system memory 313 using memory mapped write transactions across high speed data link 320. Set up of the control logic may be controlled by a setup program executed by the IDE, for example.

The transport interface protocol makes both the memory 313 and temporary trace buffer 304 in SoC A appear directly addressable from SoC A. Note that SoC A and SoC B are likely to have additional bus masters and slaves connected to their respective bus fabrics. These are not shown in this diagram for simplicity purposes. A multiple path bus fabric 307 may provide various paths for moving data around within SoC A using the multiple masters and slaves, for example. Alternatively, bus fabric 307 may be just a single bus that is shared using known or later developed access and priority protocols, for example.

As described above, the trace recording buffer in SoC B's memory 313 may be associated with a portion of SoC B and a portion of SoC A's memory map. In this case, it may be read from SoC A via the bus fabric 307 in SoC A. This may allow a trace data consumer application running within SoC A 301 to directly read trace data from SoC B's memory via SoC A's own local memory map. For example, an IDE may be hosted on SoC A and access trace data that has been recorded in memory 313 on SoC B.

In some cases, the amount of trace data stored in the temporary buffer 304 may be less than the amount needed to automatically trigger the trace transfer request event 308. In this case, an auxiliary trigger or flush event initiated by control logic in the instrumentation and trace generation logic 303 may simply create enough additional trace data (padding data) to initiate a normal transfer, for example.

In various embodiments, node to node interface 320 may be implemented in a variety of known or later developed interconnect techniques. In each embodiment, node to node interface 320 allows resources on SoC A 301, including temporary trace buffer 304, to be memory mapped into the address space of at least one bus master on SoC B so that trace data may be transferred from the temporary trace buffer 304 to the recording buffer 313 by performing memory mapped read transactions across interface 320 initiated by the bus master on SoC B 311. Various high speed data link technologies may be used to implement interface 320, such as: Serial Rapid IO (SRIO), PCI Express, Hyperlink, InfiniBand, etc., for example.

Serial Rapid IO (SRIO) is a non-proprietary high-bandwidth system level interconnect. It is a packet-switched interconnect intended primarily as an intra-system interface for chip-to-chip and board-to-board communications at Gigabyte-per-second performance levels. SRIO is widely used in connected microprocessors, and memory mapped I/O devices that operate in networking equipment, memory subsystems, and general purpose computing.

Conventional PCI, often shortened to PCI, is a local computer bus for attaching hardware devices in a computer. PCI (Peripheral Component Interconnect) is part of the PCI Local Bus standard. The PCI bus supports the functions found on a processor bus but in a standardized format that is independent of any particular processor's native bus. Devices connected to the PCI bus appear to a bus master to be connected directly to its own bus and are assigned addresses in the processor's address space. It is a parallel bus, synchronous to a single bus clock. There are several related versions of PCI, including a PCI Extended (PCI-X), Mini PCI, a serial version known as PCI Express, etc.

The HyperLink interface was developed by Texas Instruments as a high-speed, low-latency, and low-pin-count communication interface between two C66x devices. HyperLink includes both the data signals and sideband control signals; data signals are high speed SERDES (serial/deserial) and the sideband control signals are LVCMOS-based (low voltage complementary metal oxide semiconductor). The sideband signals provide the flow control and power management control information. The HyperLink interface self-initializes without processor intervention. After configuration, HyperLink has internal state machines to automatically manage the flow control.

InfiniBand is a computer network communications link used in high-performance computing featuring very high throughput. It is used for data interconnect both among and within computers. InfiniBand uses a switched fabric topology, as opposed to early shared medium Ethernet. All transmissions begin or end at a channel adapter. Each processor contains a host channel adapter (HCA) and each peripheral has a target channel adapter (TCA). These adapters can also exchange information for security or quality of service (QoS). InfiniBand transmits data in packets of up to 4 KB that are taken together to form a message. A message can be a direct memory access read from or, write to, a remote node (RDMA).

Depending on the high speed data link 320 technology, trigger event 308 may include an indication of how much data is available to transfer from temporary trace buffer 304. Using this information, bus master 315 in SoC B 311 may be able to perform a block read transaction to improve transfer speed.

Figure 4:
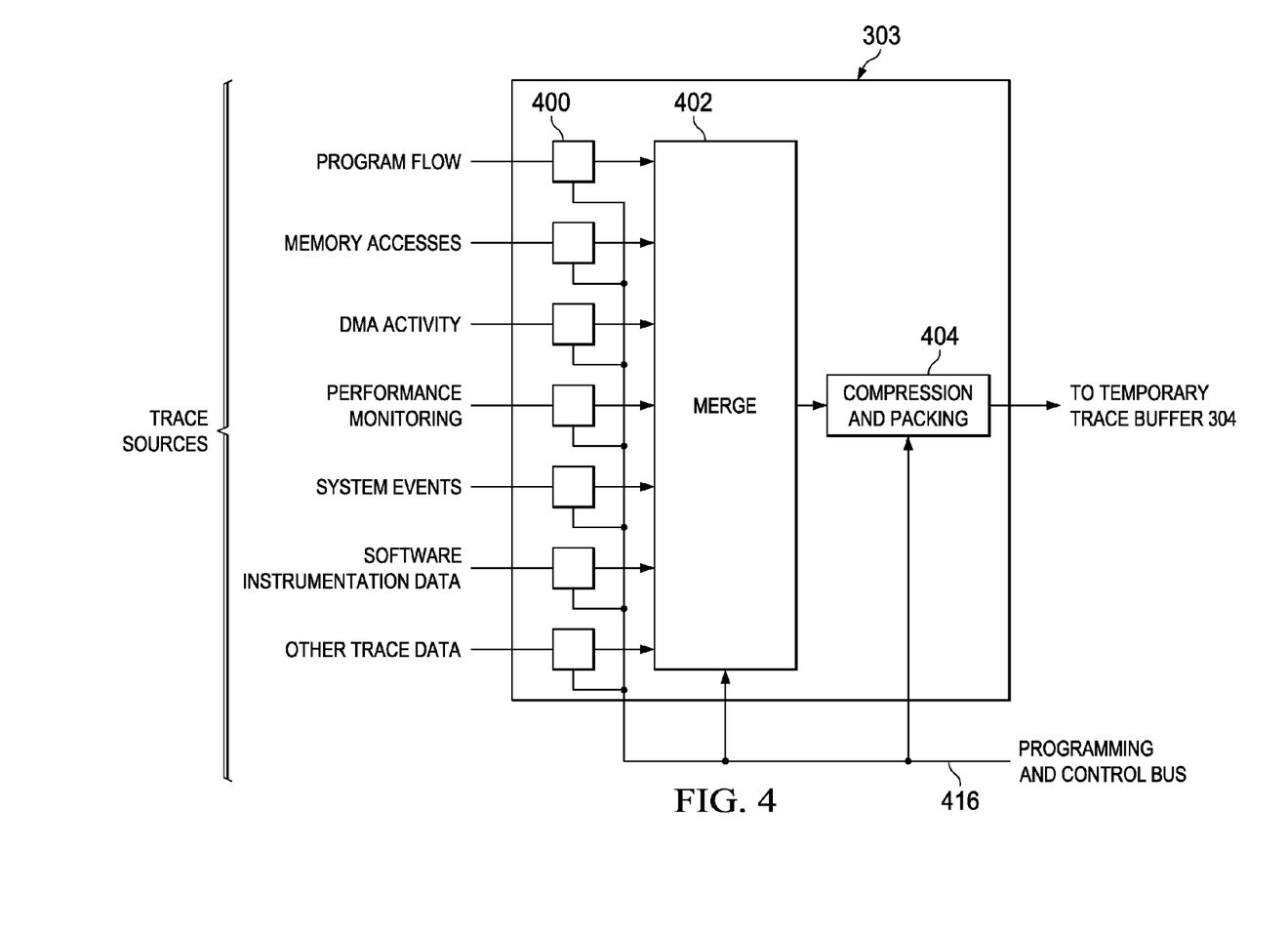
FIG. 4 is a diagram of an example Instrumentation and Trace generation logic circuit used in FIG. 3.

FIG. 4 is a more detailed diagram of Instrumentation and Trace generation logic circuit 303 in FIG. 3. In this example, the Instrumentation and Trace generation logic circuit has seven exemplary input channels to receive trace data related to program flow, memory accesses, DMA activity, performance monitoring, system events, software instrumentation data, and other system activity. One of ordinary skill in the art having access to the instant application will appreciate that there may be more or less input channels as required to monitor operation of the application computer circuit. Each input channel is coupled to a respective encoding logic block such as encoding logic block 400. One method of encoding is described in detail by Swoboda in U.S. Pat. No. 7,076, 419, filed Aug. 30, 2001, and incorporated by reference herein in its entirety. As previously discussed, encoding trace data means to add at least an identification tag to identify the source of the trace data. Other processing may be included in the encoding process. The encoding logic blocks of interest are selected while unselected channels preferably remain in a low power state. Selected blocks begin operation when enabled by a respective control signal from programming and control bus 416. Selectively enabling the encoding logic blocks advantageously provides a means to collect only trace data that is required to monitor specific application logic activity of interest while minimizing power consumption. The output from selected encoding logic blocks is then applied to merge circuit 402 where it is merged into a sequential data stream. This data stream has a respective identity tag (ID) to identify the source of each element in the data stream. The output of merge circuit 402 is then optionally compressed and packed by circuit 404. One method of compression and packing is described in detail by the ARM DDI 0314H Coresight™ components technical reference manual, and is incorporated by reference herein in its entirety. By way of explanation, compression and packing creates a data stream with both trace data source information (ID) and trace data generated by the sources where the number of identity tags is minimized. It preferably places the ID and respective trace data from each channel in a format that distinguishes between the two types of data. The compressed and packed data format identifies each entry as either an ID or data, inserts IDs in the data stream only when the source of the data changes or after a period of time, and provides maximum data bandwidth and sufficient information to determine the source of the trace data. The compressed and packed trace information is sent to be stored in temporary trace buffer 304. Temporary trace buffer 304 preferably has at least a dual port configuration so that current trace information may be read while new trace information is being received from compression circuit 404. Temporary trace buffer 304 may support simultaneous or interleaved reads and writes, for example.

In another embodiment, multiple computing cores may be fabricated on a single chip. In such an embodiment, multiple cores may be interconnected by memory bus or a bus fabric with multiple transaction paths, for example. A multi-core architecture that embodies an aspect of the present invention will now be described. In a typical embodiment, a multi-core system is implemented as a single system on chip (SoC). As used herein, the term "core," "computing node," "node," "processor module," etc. refers to a processing module that may contain an instruction processor, such as a digital signal processor (DSP) or other type of microprocessor, along with one or more levels of cache and/or bulk memory that are tightly coupled to the processor.

Figure 5:
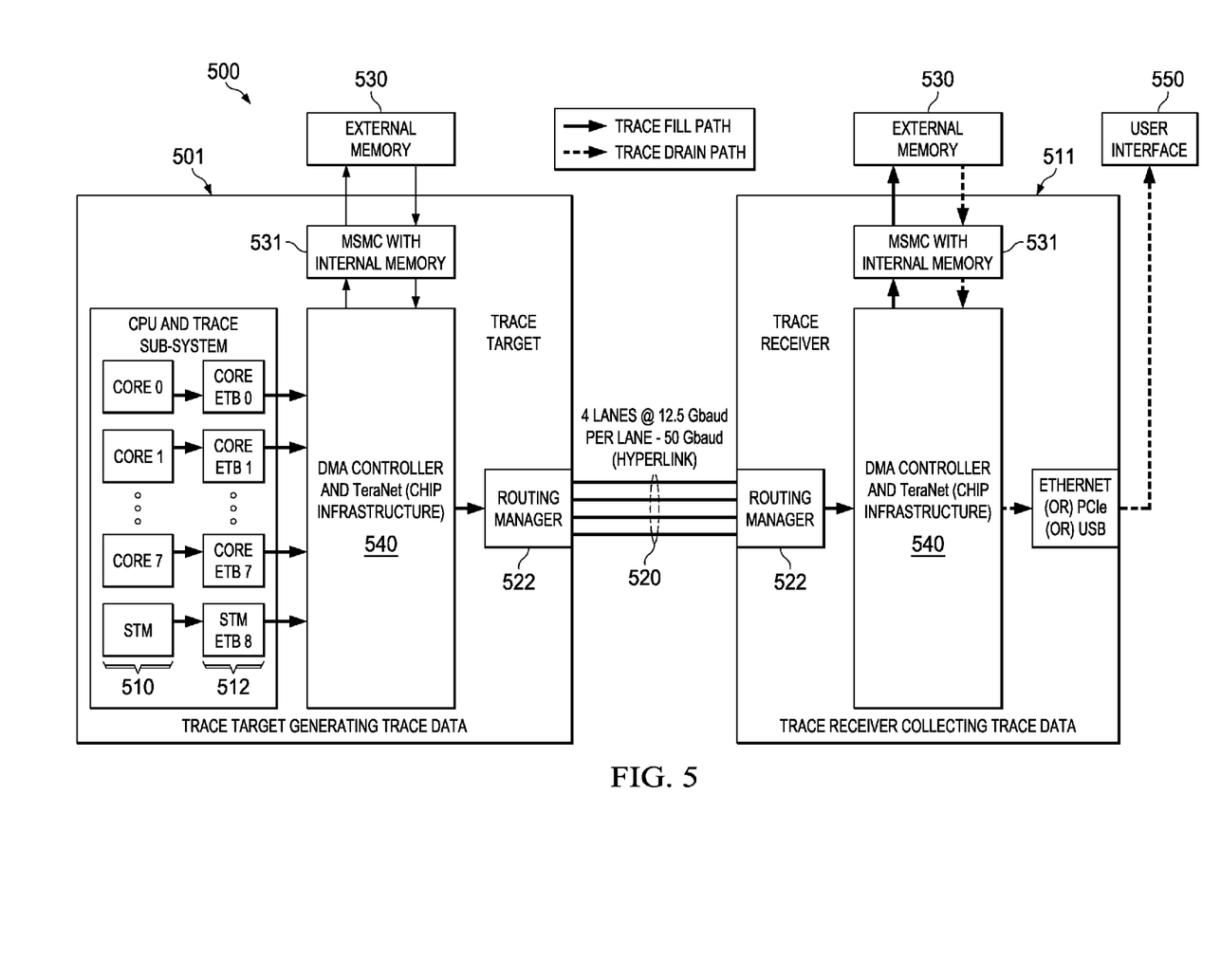
FIG. 5 is a block diagram of a system that includes two system on chip (SoC) modules interconnected with a high speed data interface.

FIG. 5 is a functional block diagram of a system 500 that includes two identical system on chip (SoC) 501, 511 that include an embodiment of the invention. SoC 501, 511 is a multi-core SoC that each includes a set of processor cores 510. Each processor core 510 includes a processor, level one (L1) data and instruction caches, and a level two (L2) cache. In this embodiment, there are eight processor cores 510; however other embodiments may have fewer or greater number of processor cores. In this embodiment, each processor is a digital signal processor (DSP); however, in other embodiments other types of processor cores may be used. In this example, multiple cores 510 within each SoC are interconnected via a packet based switch fabric that provides point to point interconnect between several devices on each cycle. Each core may receive requests from another core or from other external devices within the SoC to access various shared resources within the core, such as static random access memory (SRAM). Local SRAM memory accesses may be initiated by an external master via an interface within the core referred to as the SDMA (slave DMA). An example of SoC 501 is embodied in an SoC from Texas Instruments, and is described in more detail in "TMS320C6678—Multicore Fixed and Floating-Point Signal Processor", SPRS691, November 2010 revised March, 2014, which is incorporated by reference herein.

SoC 501, 511 includes shared memory, comprising of external memory 530 and internal memory within multi-core shared memory controller (MSMC) 531. The MSMC allows processor modules 510 to dynamically share the internal and external memories for both program and data.

Each processor core 510 may include instrumentation and trace generation logic 512 with an embedded trace data buffer (ETB) such as described above that may be accessed using memory mapped read transactions by another processing node. Trace logic 512 may be similar to the trace logic described with regard to FIGS. 3 and 4, for example.

SoC 501 may also contain an Ethernet media access controller (EMAC) network coprocessor block that may include a packet accelerator and a security accelerator that work in tandem. The packet accelerator speeds the data flow throughout the core by transferring data to peripheral interfaces such as the Ethernet ports or Serial RapidIO (SRIO) without the involvement of any module 410's DSP processor.

An extended direct memory access (EDMA) controller 540 has access to all of the ETBs within SoC. The primary purpose of the EDMA is to service user-programmed data transfers between two memory-mapped slave endpoints on the device. The general operation of a DMA engine is well known and need not be described in more detail herein. There may be multiple EDMA controllers within each SoC 501, 511, for example. EDMA traffic controllers 540 and the various system peripherals can be classified into two categories: masters and slaves. Masters are capable of initiating read and write transfers in the system and do not rely on the EDMA for their data transfers. Slaves on the other hand rely on the EDMA to perform transfers to and from them. Examples of masters include the EDMA traffic controllers, serial rapid I/O (SRIO), and Ethernet media access controller. Examples of slaves include internal memory 531, external memory 530, serial peripheral interface (SPI), universal asynchronous receiver/transmitter (UART), and inter-integrated circuit (I2C) interface.

External Hyperlink 520 provides direct chip-to-chip connectivity for local devices, and is also integral to the internal processing architecture of SoC 501, 511. External link 520 is a fast and efficient interface with low protocol overhead and high throughput, running at an aggregate speed of 50 Gbps (four lanes at 12.5 Gbps each). Working in conjunction with a routing manager 522, link 520 transparently dispatches tasks to other local devices where they are executed as if they were being processed on local resources. In this manner, resources located on SoC 511, such as shared memory 530, 531 may be memory mapped into the address space of SoC 501 and thereby accessed by a master device in SoC 501, such as DMA controller 540, using memory mapped transactions. Similarly, resources located on SoC 501, such as embedded trace buffers 512, may be memory mapped into the address space of SoC 511 and thereby accessed by a master device in SoC 511, such as DMA controller 540, using memory mapped transactions.

Activity in one or more of the processor cores 510 may cause the generation of trace data that is captured by instrumentation and trace generation logic 512. This trace data is stored in an embedded trace buffer (ETB) that is part of trace logic 512. As discussed, various known or later developed techniques may be used to compress the trace data so that more trace information can be stored in a given buffer size. As discussed above, trace data may include the program counter value, instructions, read and write data picked from one or more data buses, status information, timing information, etc., for example. The embedded trace buffers may be implemented as a first in first out (FIFO) buffer or a circular buffer, for example. In this case, pointer logic may be provided so that reading trace data from the temporary buffer may be done by repeatedly reading a same memory address, for example. In another example, the embedded trace buffers may be implemented as a ping-pong buffer in which two or more banks of linearly addressed block of memory are filled and emptied in an alternating manner, for example. Note, in this example there are nine separate ETBs(0-8), one for each of the eight processing cores and one for a system trace module (STM).

In this example, SoC 501 is configured to execute an application program on one or more of the multiple cores 510. SoC 511 is configured to gather and record the trace data in a manner that does not impact the performance of SoC 501. An IDE may then be hosted on SoC 511 to analyze the recorded trace data. A user interface 550 may be provided by a user device that allows a user to control the trace activity and analysis of the collected trace data. For example, a user interface may be provided on a terminal, tablet, smart phone, etc. The user interface device may be coupled to the system via various known or later developed technology, such as: a wired or optical connection, a wireless connection, etc., for example.

As will be described in more detail below, trace data may be pushed from each of the ETBs in SoC 501 to be recorded within shared memory 530 on SoC 511 under control of DMA controller 540 in SoC 501, for example.

Figure 6:
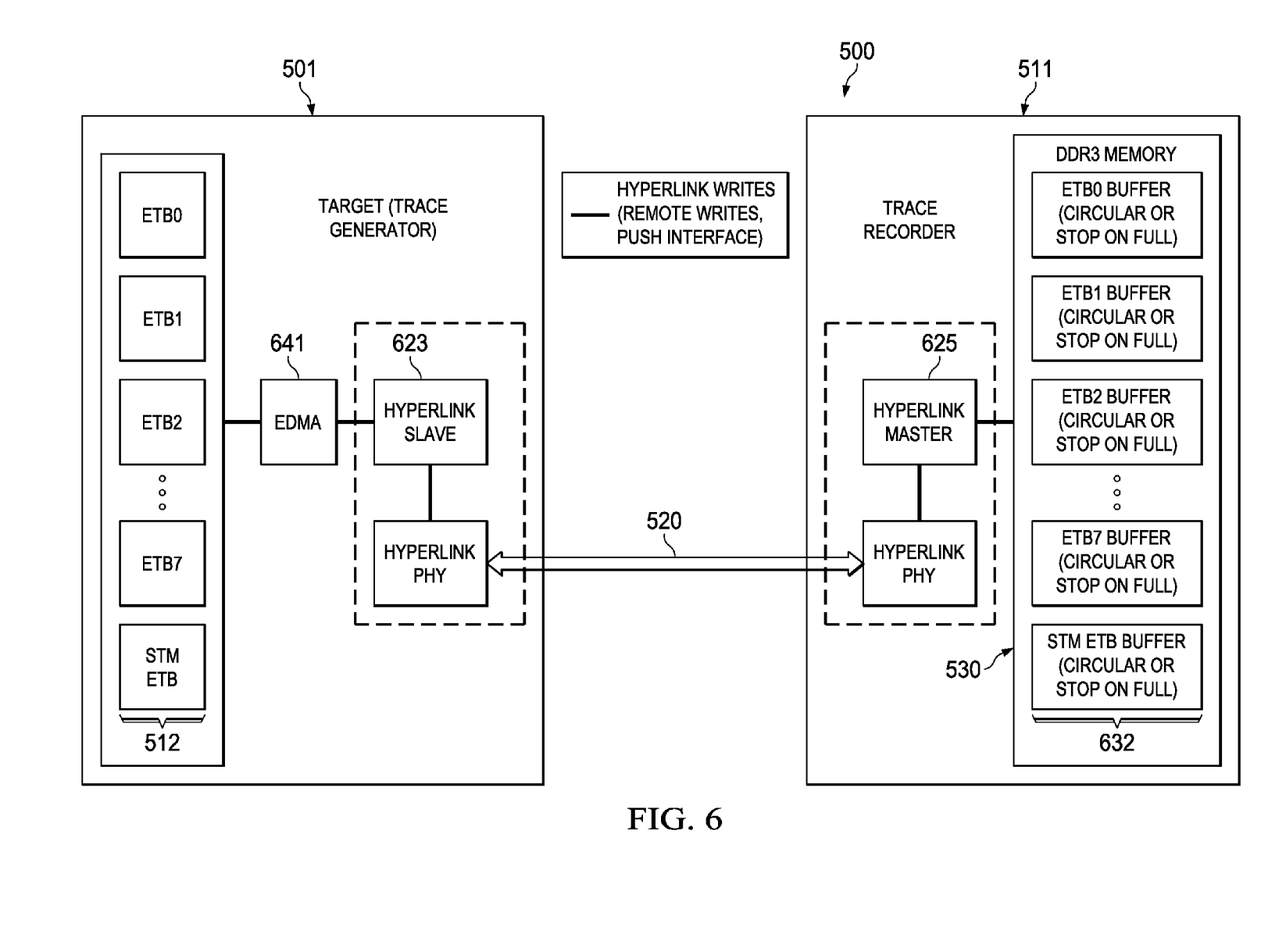
FIG. 6 is a simplified functional diagram of the system of FIG. 5 in which collection of trace data is performed.

FIG. 6 is a simplified functional diagram of the system of FIG. 5 in which collection of trace data is performed. Control logic that manages the embedded trace buffers 512 may be configured to trigger a trace transfer request event when one of the embedded trace buffers reach a selected percentage of capacity, such as 75%, for example.

Upon receipt of the trace transfer request trigger event, EDMA master 641 on SoC 501 may be configured to initiate a write transfer to an address associated with the recording buffer region 632 in memory 530, 531 of SoC 511 that is associated with the ETB(0-8) 512 that caused the trace transfer request event. Hyperlink slave 623 will receive the write transfer initiated by EDMA master 641 and forward the transaction to SoC 511 vial the high speed data link 520. Upon receipt of the data from the selected ETB, Hyperlink master 625 may then store the trace data in a selected region of shared memory 530,531 within SoC 511. Note that in this example nine different recording regions 632 are designated within shared memory 530,531. In this manner, trace data from all nine trace sources within SoC 501 may be recorded and analyzed individually. In this manner, trace data may be pushed from SoC 501 to be recorded within SoC 511.

In this manner, an IDE may be executed on one of the designated computing nodes within SoC 511 and record trace data that is generated on various computing nodes within SoC 501 without the need to attach any cables, probes or other trace capture means to SoC 501. In a similar manner, any of the nodes within SoC 511 may be traced and any of the computing nodes within SoC 501 may be designated to act as a host processor for an IDE, for example.

Figure 7:
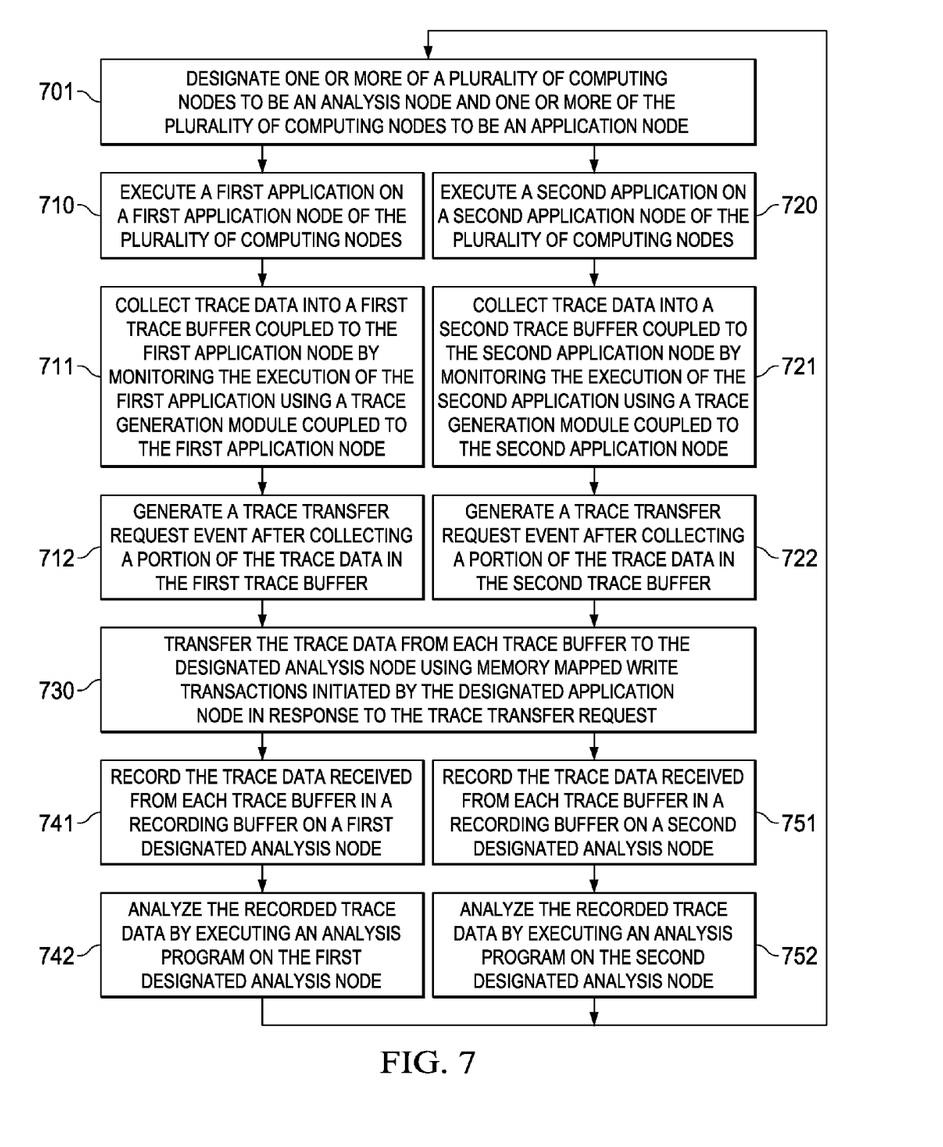
FIG. 7 is a flow chart that illustrates various options for tracing using a remote recording buffer.

FIG. 7 is a flow chart that illustrates various options for tracing using a remote recording buffer in a system that has a plurality of computing nodes interconnected by high speed data links. In all of the scenarios described below, changes in the node(s) being traced and the node(s) hosting the IDE may occur without the need to attach or move any cables, probes, or other trace capture means from the system, since all of the trace data is moved from the node being traced to the node that is hosting the IDE via high speed data links that are part of the total system. In this manner, debugging or performance optimization may be easily performed on embedded systems and in systems that are deployed in a working environment.

Initially, the IDE is executed on one of the computing nodes in a system and may provide a user interface to a developer or other technician via various known or later developed user access mechanism. For example, a user interface may be provided on a terminal, tablet, smart phone, etc. The user interface device may be coupled to the system via various known or later developed technology, such as: a wired or optical connection, a wireless connection, etc., for example.

Using the IDE, a user may designate 701 one or more of a plurality of computing nodes to be an analysis node and one or more of the plurality of computing nodes to be an application node. A first application may then be executed 710 on a first application node of the plurality of computing nodes. Trace data may be collected 711 into a first trace buffer coupled to the first application node by monitoring the execution of the first application using a trace generation module coupled to the first application node, as described in more detail above.

A trace transfer request event may be generated 712 in the first designated application node of the plurality of computing nodes after collecting a portion of the trace data in the first trace buffer. The trace data may then be recorded 741 on the first designated analysis node by transferring 730 the portion of trace data from the first trace buffer to a recording buffer in the first designated analysis node in response to the transfer request by performing memory mapped write transfers initiated by the first designated application node across a high speed data link coupling the two nodes. As described above in more detailed, the recording buffer is memory mapped into an address space of the first designated application node. The recorded trace data may then be analyzed 742 by executing an analysis program on the first designated analysis node. This sequence may be repeated in order to collect and record a long sequence of trace data.

At some point in time, a different one of the computing nodes may be designated 701 as the recording and analysis node. At that time, the trace data may then be recorded 751 on the second designated analysis node by transferring 730 the portion of trace data from the first trace buffer to a recording buffer in the second designated analysis node in response to the transfer request by performing memory mapped write transfers initiated by the first designated application node across another high speed data link. Again, the recording buffer is memory mapped into an address space of the first designated application node, as described in more detail above. The recorded trace data may then be analyzed 752 by executing an analysis program on the second designated analysis node.

At another point in time, a different one of the computing nodes may be designated 701 as the application node. At that time, a second application may then be executed 720 on the second application node of the plurality of computing nodes. Trace data may be collected 721 into a second trace buffer coupled to the second application node by monitoring the execution of the second application using a trace generation module coupled to the second application node, as described in more detail above. A trace transfer request event may be generated 722 to second application node of the plurality of computing nodes after collecting a portion of the trace data in the second trace buffer. The trace data may then be recorded on the currently designated analysis node by transferring 730 the portion of trace data from the second trace buffer to a recording buffer in the currently designated analysis node in response to the transfer request by performing memory mapped write transfers initiated by the second designated application node. As described above in more detailed, the currently designated recording buffer is memory mapped into an address space of the second designated application node. The recorded trace data may then be analyzed by executing an analysis program on the currently designated analysis node.

It should be realized that any number of computing nodes may be traced 711, 721 in parallel using the dedicated trace logic coupled to each computing node. Similarly, tracing 711 may be performed during a first time period, tracing 721 may be performed during a second time period, etc. Similarly, recording 741 and analysis 742 may occur during a first period of time, while recording 751 and analysis 752 may occur during a second period of time, etc.

Note, in this example, the protocol used by the high speed data links connecting the plurality of computing nodes allows an IDE, for example, to selectively memory map trace resources on one or more different application computing nodes to trace memory on one or more different trace analysis computing nodes. Hence, the trace collection, trace recording, and trace analysis may be easily performed on different computing nodes within the system without disturbing or impacting the performance of the node that is executing the application that is being traced.

Note, in the system described as an embodiment of this invention, there can be any practical number of computing nodes connected with various connection topologies, such as point-to-point, ring, star, mesh, etc. Irrespective of the connection topology used, the protocol used by the high speed data link allows the IDE to selectively memory map trace resources on one or more different application computing nodes to trace memory on one or more different trace analysis computing nodes.

In this manner, execution of an application program on one or more of the computing nodes within a system may be traced, with the collected trace data being sent to one or more different recording nodes and analyzed on one or more analysis nodes using memory mapped read or write transactions over high speed data links without the need to change any physical connections.

System Example

Figure 8:
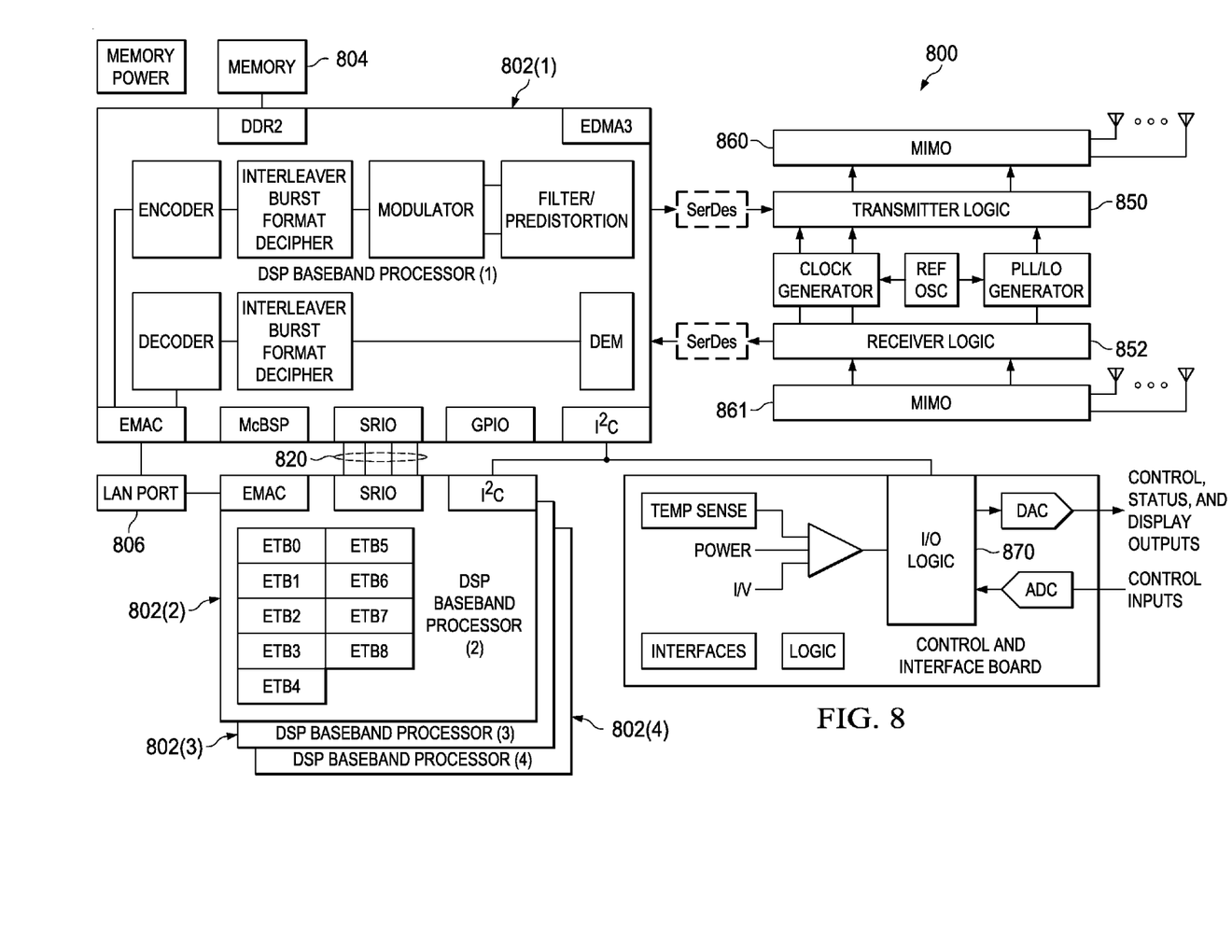
FIG. 8 is a block diagram of an example system that includes multiple interconnected SoCs, such as those illustrated in FIG. 5.

FIG. 8 is a block diagram of a base station 800 for use in a radio network, such as a cell phone network. In this example, there are several SoC 802(1-4) that are similar to the SoC of FIG. 5, 6. Each SoC 802 may include multiple computing nodes with associated embedded trace buffers ETB(0-8). All of the SoCs 802 may be interconnected using high speed data links, such as Hyperlink and/or SRIO 820 links. External memory 804 may be coupled to one or more of the SoCs and may be used, in addition to the internal memory within SoC 802, to store application programs and data being processed by SoCs 802. While this example is for a specific application, it is only intended to illustrate an example system and it should be recognized that the tracing concepts described herein are applicable to any system that includes multiple computing nodes that are interconnected by high speed data links that support memory mapped transactions.

Transmitter logic 850 performs digital to analog conversion of digital data streams transferred by the external DMA (EDMA) controller and then performs modulation of a carrier signal from a phase locked loop generator (PLL). The modulated carrier is then coupled to multiple output antenna array 860. Receiver logic 852 receives radio signals from multiple input antenna array 861, amplifies them in a low noise amplifier, and then converts them to a digital stream of data that is transferred to SoCs 802(*n*) under control of EDMA. There may be multiple copies of transmitter logic 850 and receiver logic 852 to support multiple antennas.

The Ethernet media access controller (EMAC) module in each SoC 802(*n*) is coupled to a local area network port 806 which supplies data for transmission and transports received data to other systems that may be coupled to the internet.

An application program executed on one or more of the processor modules within SoC 802(*n*) encodes data received from the internet, interleaves it, modulates it and then filters and pre-distorts it to match the characteristics of the transmitter logic 850. Another application program executed on one or more of the processor modules within SoC 802(*n*) demodulates the digitized radio signal received from receiver logic 862, deciphers burst formats, and decodes the resulting digital data stream and then directs the recovered digital data stream to the internet via the EMAC internet interface. The details of digital transmission and reception are well known.

Input/output logic 870 may be coupled to SoC 802(*n*) via the inter-integrated circuit (I2C) interface to provide control, status, and display outputs to a user interface and to receive control inputs from the user interface. The user interface may include a human readable media such as a display screen, indicator lights, etc. It may include input devices such as a keyboard, pointing device, etc.

Tracing logic ETB(0-8) embedded within each of the computing nodes within SoC 802(*n*), as described in more detail above, allows debugging and performance optimization to be easily performed on system 800 both in the lab and in the field after a system has been installed in a working environment. As described in more detail above, anyone of the computing nodes within the SoCs 802(*n*) may be designated to host an IDE, and/or perform trace data recording and analysis. The designated recording and analysis node may be changed over time, as described in more detail above. High speed data links that are part of each SoC 802(*n*) allow trace data to be transferred and recorded by simply using memory mapped write transactions to push trace data from an embedded trace buffer in a node that is executing the application program to another computing node that is the designated recording host, for example.

In this manner, execution of an application program on one or more of the computing nodes within system 800 may be traced, with the collected trace data being sent to one or more different recording nodes and analyzed on one or more analysis nodes using memory mapped write transactions over high speed data links without the need to change any physical connections.

Other Embodiments

Although the invention finds particular application to Digital Signal Processors (DSPs), implemented, for example, in a System on a Chip (SoC), it also finds application to other forms of processors. A SoC may contain one or more megacells or modules which each include custom designed functional circuits combined with pre-designed functional circuits provided by a design library.

While the invention has been described with reference to illustrative embodiments, this description is not intended to be construed in a limiting sense. Various other embodiments of the invention will be apparent to persons skilled in the art upon reference to this description. For example, in another embodiment, a different interconnect topology may be embodied.

Additional examples of various system configurations that may embody memory mapped trace buffers and/or recording buffers as described herein are described in related U.S. patent application Ser. No. 14/501,442, filed Sep. 30, 2014, entitled "USING AN IN-SYSTEM COMPONENT AS AN EMBEDDED TRACE RECEIVER," which is incorporated by reference herein.

While examples were described herein in which similar SoCs are interlinked within a system, it should be understood that various system may include different types of SoCs that may be interconnected via high speed data links and use memory mapped transactions to transfer trace data across the high speed data links, as described in more detail above.

In various embodiments, control logic may be provided to control the recording buffer such that it may be configured as a circular buffer, for example. In another embodiment, the recording buffer may be configured as a stop-on-full buffer that stops additional trace data from being recorded when the buffer becomes full of trace data.

In another embodiment, the shared resource that holds the recording buffer may be just a memory that is not part of a cache. The shared resource may by any type of storage device or functional device that may be accessed by multiple masters in which only a portion of interconnect protocol information is needed to perform a local access to the shared resource.

In some embodiments in which multiple high speed data paths are available, the IDE may select a particular path for transferring trace data that is not used by the computing node that is executing the application that is being traced. In this manner, the tracing process has no effect on the operation and performance of the computing node as it executes the application.

Certain terms are used throughout the description and the claims to refer to particular system components. As one skilled in the art will appreciate, components in digital systems may be referred to by different names and/or may be combined in ways not shown herein without departing from the described functionality. This document does not intend to distinguish between components that differ in name but not function. In the following discussion and in the claims, the terms "including" and "comprising" are used in an open-ended fashion, and thus should be interpreted to mean "including, but not limited to . . . ." Also, the term "couple" and derivatives thereof are intended to mean an indirect, direct, optical, and/or wireless electrical connection. Thus, if a first device couples to a second device, that connection may be through a direct electrical connection, through an indirect electrical connection via other devices and connections, through an optical electrical connection, and/or through a wireless electrical connection.

Although method steps may be presented and described herein in a sequential fashion, one or more of the steps shown and described may be omitted, repeated, performed concurrently, and/or performed in a different order than the order shown in the figures and/or described herein. Accordingly, embodiments of the invention should not be considered limited to the specific ordering of steps shown in the figures and/or described herein.

It is therefore contemplated that the appended claims will cover any such modifications of the embodiments as fall within the true scope and spirit of the invention.

What is claimed is:

1. A method for operating a computer system having a plurality of computing nodes, comprising:
   (a) executing a first application on a first computing node of the plurality of computing nodes;
   (b) designating one of the plurality of computing nodes, other than the first computing node, as a first designated analysis node for trace data recording and analysis for a first period of time;
   (c) designating another one of the plurality of computing nodes, other than the first computing node, as a second designated analysis node for trace data recording and analysis for a second period of time;
   (d) collecting trace data into a trace buffer of the first computing node by monitoring the execution of the first application using a trace generation module coupled to the first computing node;
   (e) recording a portion of the trace data from the first computing node in the first analysis node by transferring the portion of the trace data from the trace buffer to a first recording buffer in the first analysis node by performing memory mapped write transfers initiated by the first computing node during the first period of time; and
   (f) recording a portion of the trace data from the first computing node in the second analysis node by transferring the portion of the trace data from the trace buffer to a second recording buffer in the second analysis node by performing memory mapped write transfers initiated by the first computing node during the second period of time,
   (g) in which the first recording buffer is memory mapped into an address space of the first computing node during the first period of time and the second recoding buffer is memory mapped into the address space of the first computing node during the second period of time.

2. The method of claim 1 including:
   executing an analysis application on the first analysis node that analyzes the trace data transferred from the trace buffer to the recording buffer on the first analysis node during the first period of time; and
   executing an analysis application on the second analysis node that analyzes the trace data transferred from the trace buffer to the recording buffer on the second analysis node during the second period of time.

* * * * *